P. R. HOY.
STEREOPTICON SLIDE CARRIER.
APPLICATION FILED SEPT. 21, 1908.
941,712.
Patented Nov. 30, 1909.
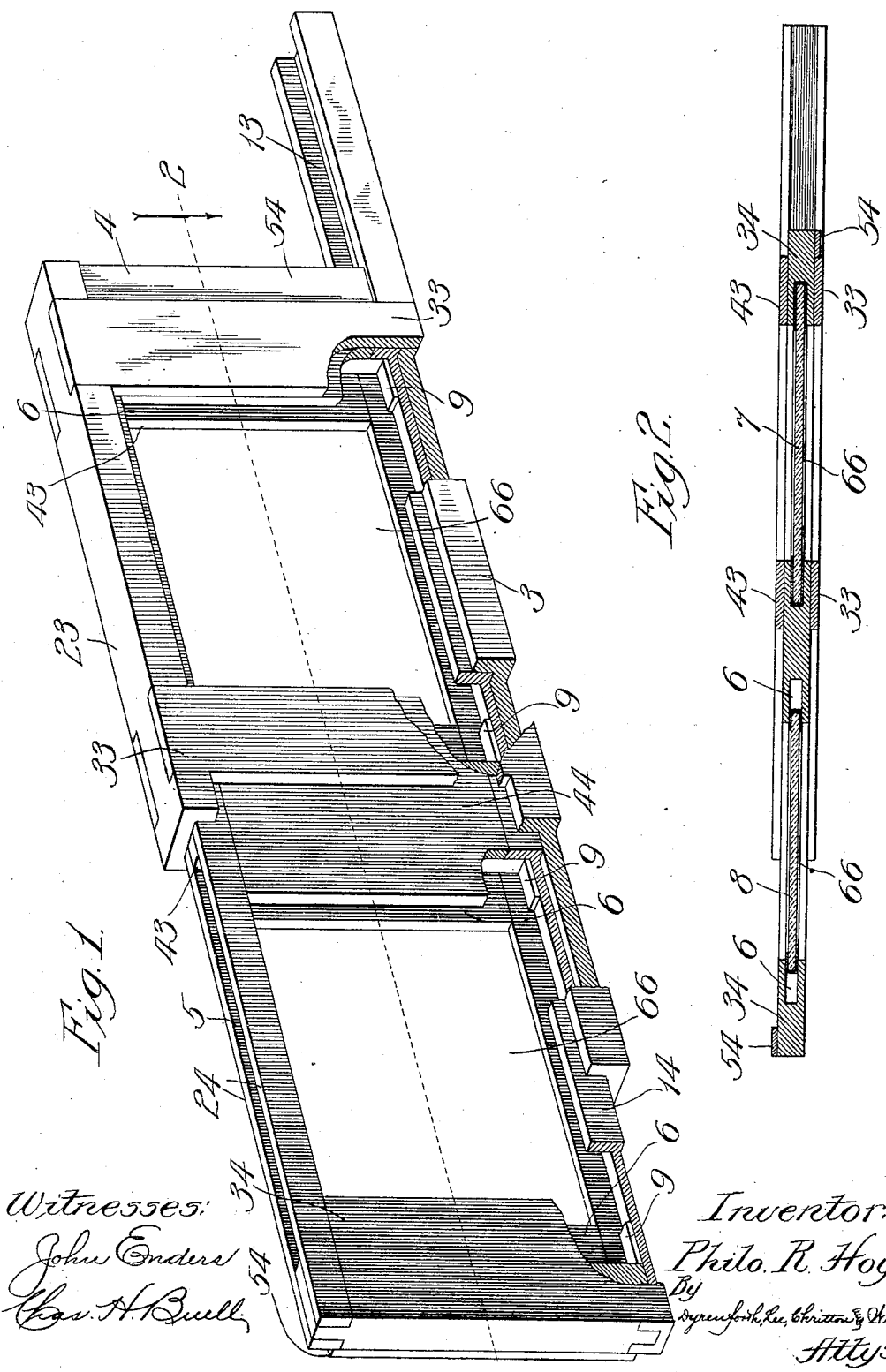
Witnesses:
John Enders
Chas. H. Buell
Inventor:
Philo. R. Hoy
By Dyrenforth, Lee, Chritton & Wiles
Attys

UNITED STATES PATENT OFFICE.

PHILO R. HOY, OF CHICAGO, ILLINOIS, ASSIGNOR TO McINTOSH STEREOPTICON COMPANY, OF CHICAGO, ILLINOIS, A CORPORATION OF ILLINOIS.

STEREOPTICON-SLIDE CARRIER.

941,712.  Specification of Letters Patent.  Patented Nov. 30, 1909.

Application filed September 21, 1908. Serial No. 453,920.

*To all whom it may concern:*

Be it known that I, PHILO R. HOY, a citizen of the United States, residing at Chicago, in the county of Cook and State of Illinois, have invented a new and useful Improvement in Stereopticon-Slide Carriers, of which the following is a specification.

My invention relates to an improvement in the construction of carriers used for holding the "slides," which comprise pictures on glass plates for stereopticon-display, for introducing and exhibiting them in a stereopticon.

The carrier in common use consists, as its generally stated construction, of a stationary female member containing a central rectangular display-opening, and a longitudinally reciprocable male member, guidingly movable in the stationary member and containing two rectangular display-openings to register in succession with the display-opening in the stationary member and adapted to hold slides introduced into them through their open upper ends. The slides in more common use are of two different sizes, the larger of the two being known as the "American," the dimensions of which are $3\frac{1}{4}$ by 4 inches, and the smaller as the "English" slide with dimensions of $3\frac{1}{4}$ by $3\frac{1}{4}$ inches; and exhibitors of stereopticon-views ordinarily are supplied with both sizes requiring to be used in the same frame. The openings in the movable carrier-member which are covered by the slides are each of the same dimensions adapted to properly expose the larger size of slide, so that difficulty is experienced in properly centering therein the smaller size.

The primary object of my improvement is to avoid this difficulty by adapting the aforesaid similar openings to be fitted by properly center and render self-seating slides of either size without requiring any adjustment of the smaller size in the carrier other than that of merely introducing it into place therein.
I accomplish this object by the construction illustrated in the accompanying drawing, in which—

Figure 1 is a broken perspective view of my improved slide-carrier, and Fig. 2 is a section on line 2, Fig. 1, with the slides in place in the carrier.

The stationary and movable carrier-members 3 and 4 are shown to be of the ordinary general construction. The member 3 is a frame consisting of a straight trough-shaped base 13 and a shorter top 23 of inverted-trough shape rigidly connected near its ends with the base by pairs of parallel bars or strips 33 and 43 forming a slide way between the members of said pairs. The member 4 is a frame consisting of a trough-shaped base-rail 14 of the same length as and fitting in the base 13 to be reciprocable therein; a top-rail 24 of the same length as the base-rail, formed of parallel strips spaced apart to provide between them slide-insertion openings as shown at 5 in Fig. 1; similar end-bars 34 rigidly connecting the bottom and top rails by tongues on the opposite ends of the bars respectively fastened in the trough of the bottom-rail and between the strips forming the top-rail to space them and form the openings 5; and a central panel 44 tongued into the trough-rail 14 and between the strips of the top-rail 24. Stops 54 are provided on the opposite sides of the ends of the movable member to abut against the ends of the stationary member to limit the movement of the slide.

The end-bars 34 and panel 44 are provided with deep channels 6 in their opposing edges to receive and retain the edges of the slides 7 and 8 (Fig. 2), which are introduced therein at the openings 5. The slide 7 of larger (American) size fits, though loosely, between the backs of opposing channels 6 for properly centering it; but the smaller (English) slide 8 being considerably narrower than the space between such channel-backs, without any provision to the contrary, requires careful adjustment and even the use of fastening means for properly centering it, incurring delay and other objectionable consequences in placing it in the carrier. I avoid all such objections by causing the opposing channels 6 to overlap slightly the smalled slide, to retain it, and, primarily, by providing in the lower corner-portion of the channel adjacent to the end bars 34 and the central panel 44 a slide-seat and stop, extending only slightly, say, to about three thirty-seconds of an inch, above the base of the trough-rail 14 and lengthwise thereof to form a space between companion stops sufficient to receive the smaller slide. The means shown for this purpose are strips 9 of wood, paper, or other suitable material, secured in the corners of the channel-bases, but the same purpose may be subserved by other means in any of various forms. Thus, when a larger slide is introduced into either opening 66, it will be supported at the lower edges of its corner-portions upon the seats 9 and be properly centered in its position notwithstanding its elevation by the seats because of the slightness thereof which renders negligible the displacement, and when a smaller slide is introduced, it seats directly upon the bottom of the trough-rail 14 and is confined at the lateral edges of its lower corner portions between the seats 9, then forming stops for holding it in its properly centered position.

What I claim as new and desire to secure by Letters Patent is—

1. In a slide-carrier, the combination with a movable member having slide-display openings provided with lateral channels, of raised slide-seats in the lower ends of said channels forming stops for slides of smaller size, for the purpose set forth.

2. In a slide-carrier, the combination with a stationary member, of a movable member having slide-display openings provided with lateral channels adapted to overlap and retain slides of varying width, and raised slide-seats in the lower ends of said channels forming stops for slides of smaller size, for the purpose set forth.

3. In a slide-carrier, the combination with a movable member having slide-display openings provided with lateral channels, of strips secured in the lower ends of said channels and forming seats and stops, respectively, for slides of larger and smaller size, for the purpose set forth.

4. In a slide-carrier, the combination with a stationary member, of a movable member having slide-display openings provided with lateral channels adapted to overlap and retain slides of varying width, and slide-seating stops consisting of strips secured in the lower ends of said channels, for the purpose set forth.

PHILO R. HOY.

In presence of—
 RALPH SCHAEFER,
 A. U. THORIEN.